United States Patent [19]

Roen

[11] 4,017,725
[45] Apr. 12, 1977

[54] SOLAR POWERED PORTABLE CALCULATOR

[75] Inventor: Stephen A. Roen, New York, N.Y.

[73] Assignee: Litton Business Systems, Inc., Morris Plains, N.J.

[22] Filed: Jan. 3, 1975

[21] Appl. No.: 538,308

[52] U.S. Cl. .............................. 235/152; 186/206; 250/215; 320/2

[51] Int. Cl.² .................... G06F 15/30; H01V 1/30

[58] Field of Search .......... 235/152; 136/206, 213, 136/89; 320/2, 61; 340/172.5; 250/215; 58/23 C

[56] References Cited

UNITED STATES PATENTS

| 2,780,765 | 2/1957 | Chapin et al. | 320/2 |
|---|---|---|---|
| 2,919,353 | 12/1959 | Paradise | 320/2 |
| 2,946,945 | 7/1960 | Regnier et al. | 320/2 |
| 2,951,163 | 8/1960 | Shaffer et al. | 320/2 |
| 3,731,474 | 5/1973 | Tsurvishi | 58/23 C |

FOREIGN PATENTS OR APPLICATIONS

| 240,131 | 8/1969 | U.S.S.R. | 136/206 |
|---|---|---|---|
| 1,234,871 | 6/1971 | United Kingdom | 136/206 |

Primary Examiner—Malcolm A. Morrison
Assistant Examiner—Errol A. Krass
Attorney, Agent, or Firm—Stephen A. Roen; Norman Friedman; Robert F. Rotella

[57] ABSTRACT

A portable calculator utilizing a solar panel array which can be either slidably moved within the calculator's housing or pivotly connected to it and which when exposed to incident light provide power for the calculator.

7 Claims, 6 Drawing Figures

SOLAR POWERED PORTABLE CALCULATOR

BACKGROUND OF THE INVENTION

Portable battery operated handheld calculators have been developed but they have various shortcomings which affect their usefulness. These devices require that the operating batteries be either replaced or recharged when their power has been dissipated and goes below a certain level. Such replacement or recharging is not always possible unless the user has access to either proper replacement batteries or an electrical power supply capable or recharging the operating batteries.

SUMMARY OF THE INVENTION

It is, therefore, an object of this invention to provide an improved portable calculator.

A further object of this invention is to provide a solar powered portable calculator.

An additional object of this invention is to provide a portable calculator which is powered by a solar cell array.

A still further object of this invention is to provide a portable calculator having a battery supply which is trickle charged by a solar cell array.

These and other objects of the invention are accomplished in the preferred embodiment by providing a solar cell array mounted on a panel which slides from within the interior of the calculator housing through one end thereof whereby the solar panel is exposed to the light thereby powering the calculator or trickle charging its power or operating batteries. Another embodiment accomplishes such objects by providing a solar panel within one end of the calculator housing and pivoting such section into a horizontal orientation to expose it to the light. Still another embodiment utilizes the solar panel within a pivotable side section of the calculator housing. Another embodiment utilizes multiple solar panels mounted within two contiguous bottom sections of the calculator housing and pivotably arranged so that they fold out in a horizontal orientation to expose the active surfaces of the solar cells to the light.

BRIEF DESCRIPTION OF THE DRAWINGS

Similar reference numerals denote the similar parts in the different views.

DESCRIPTION OF THE INVENTION

Figure 1:
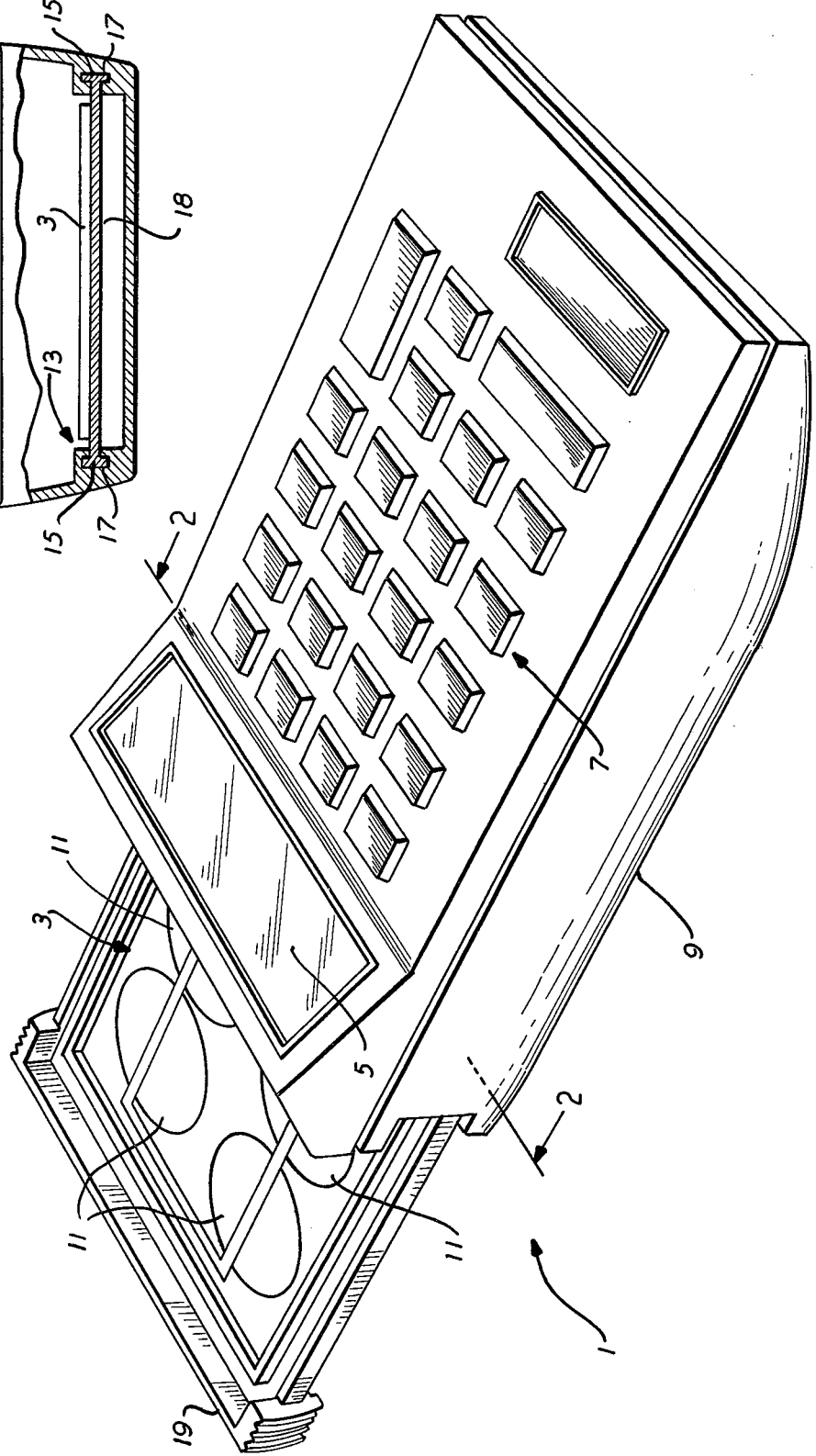
FIG. 1 is a perspective view of a portable handheld calculator embodying the present invention wherein the slidable solar panel is exposed to the light.
Figure 2:
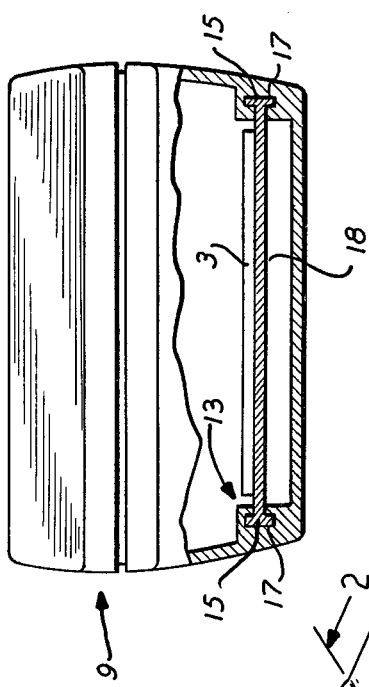
FIG. 2 is a simplified cross-sectional view of the interior of the housing of the calculator, taken along the line 2 — 2 of FIG. 1.

Referring to FIGS. 1 and 2 wherein the preferred embodiment is illustrated, a handheld calculator 1 is powered by a solar cell panel 3. The calculator 1 includes a display 5, preferably utilizing light emitting diodes, at one end angularly disposed for easy reading and a standard keyboard 7, all contained in a housing unit 9. The solar cell panel 3 is slideably mounted within the calculator 1 at its display end. The solar cell panel 3 comprises a plurality of individual disc shaped solar cells 11, which are connected in series, and mounted flat and arrayed within panel 3. The solar panel 3 slides into the interior of the calculator 1 when not in use. The slide mechanism comprises a rail-channel arrangement 13, having an inner slideable rail portion 15 being connected throughout its length and at its center to an integral flat supporting plate 18 upon which is mounted the solar polar 3. Channel portions 17 are integrally moulded within the interior sides of the housing unit 9 and are formed parallel to each other and horizontally oriented. Connected to the front end of the solar panel 3 at the ends of the slidable rail portions 15 is an end plate 19 configured such that, when the solar panel 3 is completely recessed within the calculator housing 9, it conforms to the exterior shape of the end of the calculator housing 9.

Figure 3:
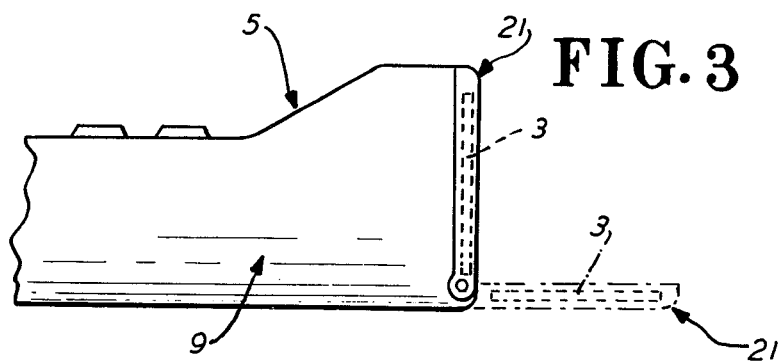
FIG. 3 is a simplified side view of another embodiment of the invention with the section containing the solar panel in its operating position shown in dotted lines.

Referring now to FIG. 3, another embodiment of a solar cell powered handheld calculator is illustrated. In this embodiment the back end casing portion 21 of the calculator housing 9 is pivoted at its lower end and folds down into a horizontal position to expose to the light a solar panel 3 fixedly mounted within said hollow back end portion 21.

Figure 4:
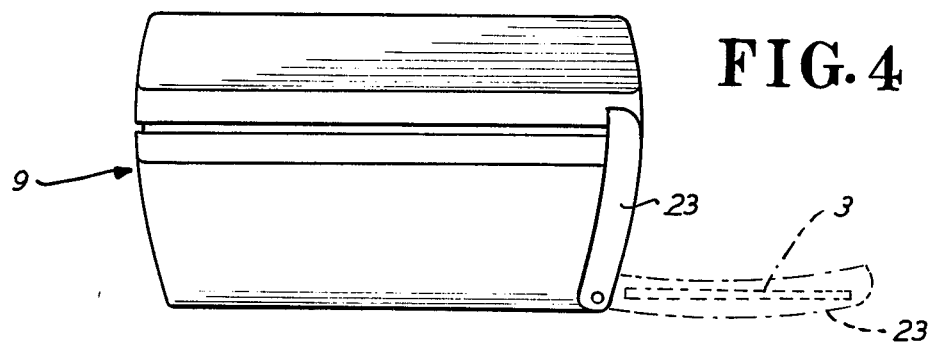
FIG. 4 is a simplified end view of still another embodiment of the invention with the section containing the solar panel in its operating position shown in dotted lines.

Referring now to FIG. 4, still another embodiment of a solar cell powered handheld calculator is illustrated. In this embodiment one or both side portions 23 of the calculator housing 9 are pivoted at its lower end to the main housing 9 and pivot into a horizontal position. Located within said hollow side portions 23 and exposed to the light is a solar panel 3 fixedly mounted therein.

Figure 5:
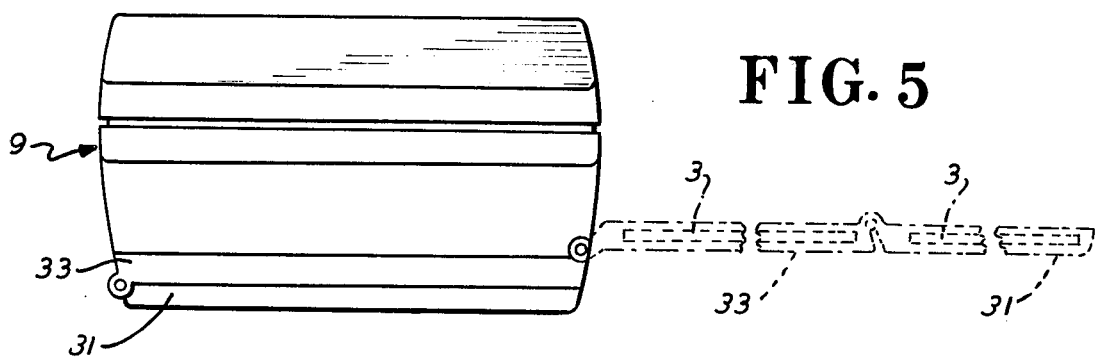
FIG. 5 is a simplified end view of a further embodiment of the invention with the sections containing the solar panels in its operating position shown in dotted lines.

Referring now to FIG. 5 another embodiment of a solar powered calculator is illustrated. This embodiment utilizes a folding fan arrangement of solar panel sections. This arrangement includes a first bottom section 31, which is hollow and tray shaped and configured to conform to the calculator housing's 9 shape and which includes within it and fixedly mounted thereto a solar panel 3. One upper edge thereof is hinged to the lower edge of a second housing section 33. This second housing section is also shaped to conform to the configuration of the calculator's housing 9, and has fixedly mounted therein another solar panel 3. These two housing sections 31 and 33 are hinged in such a manner that both solar panels active surfaces face each other when they are in the closed position. Section 33 is hinged to a bottom edge of the main portion of the calculator housing 9 at its upper edge. When both these two housing sections are folded out into a horizontal operating position the solar panels 3 within each are exposed to the light.

Figure 6:
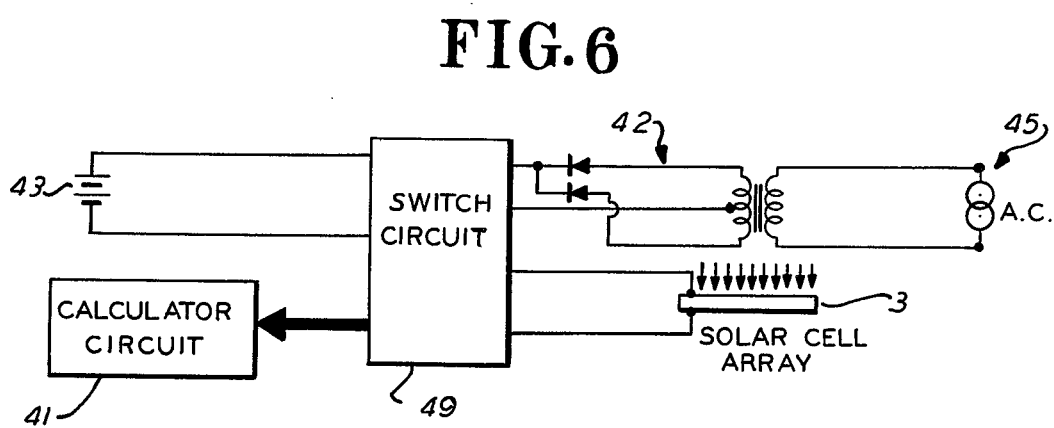
FIG. 6 is a simplified, partially schematic and partially functional block, diagram of an electric circuit incorporating the features of this invention.

Referring now to the electrical power circuit of FIG. 6 in normal operation the calculator circuitry 41 is powered by rechargeable power or operating batteries 43 of about five volts and of the nickel-cadmium or alkaline types. These batteries 43 may be conventionally recharged from a 120 volt a.c. source 45 by utilizing a conventional transformer diode converter circuit 42 to provide the required d.c. charge or alternately such d.c. output voltage can be utilized directly to power the calculator circuitry 41. In these embodiments when the solar panel 3 is exposed to the light an output voltage is generated therefrom, which, depending on the total power available which is a function of the size of the array, can be utilized to either directly power the calculator circuitry 41 or in the preferred embodiment trickle charge the power or operating battery supply 43. An appropriate, conventional, switching circuit 49 is utilized to perform the desired function.

Obviously many modifications and variations of the present invention are possible in light of the above teachings. It is therefore to be understood that within the scope of the appended claims the invention may be practiced otherwise than as specifically described.

What is claimed is:

1. A portable calculator comprising:
   a housing having a keyboard and indicator means thereon;
   solar panel means; and
   means for allowing movement of said solar panel means, coupled to said housing, from a first position within said housing to a second position exposing said solar panel means, comprising a rail-channel guide means for slidably moving said solar panel means.

2. A portable calculator according to claim 1 wherein said means for allowing movement of said solar panel means exposes said panel means to incident light in substantially the same orientation as said keyboard is exposed to incident light.

3. A portable calculator comprising:
   a housing having a keyboard and indicator means thereon;
   solar panel means; and
   means for allowing movement of said solar panel means, coupled to said housing, from a first position within said housing to a second position exposing said solar panel means, comprising pivoting means connected at one end to one edge of said housing and at the other end to said solar panel means.

4. A portable calculator according to claim 3, wherein said solar panel means are pivotably connected to each other whereby they are horizontally oriented with respect said housing when in said second position.

5. A portable calculator according to claim 3 wherein said means for allowing movement of said solar panel means exposes said panel means in substantially the same orientation as said keyboard is exposed to incident light.

6. A portable calculator comprising:
   a housing having a keyboard and indicator means thereon;
   solar panel means;
   means for allowing movement of said solar panel means, coupled to said housing, from a first position within said housing to a second position exposing said solar panel means; and
   switching means for connecting said solar panel means to power said portable calculator.

7. A portable calculator according to claim 6, additionally comprising;
   connecting means for connecting a battery power supply to operate said calculator and
   wherein said switching means is coupled to said connecting means, for trickle charging said power supply.

* * * * *